US005916665A

United States Patent [19]

Fischer et al.

[11] Patent Number: 5,916,665

[45] Date of Patent: *Jun. 29, 1999

[54] FORM WITH INTEGRATED, SEPARABLE CARD AND MULTILAYER MATERIAL FOR PRODUCING SUCH A FORM

[75] Inventors: Jules Fischer, Widen, Switzerland; Bernhard Sinnhuber, Linz, Austria

[73] Assignee: Folien Fisher AG, Dottikon, Switzerland

[ * ] Notice: This patent is subject to a terminal disclaimer.

[21] Appl. No.: 08/620,503

[22] Filed: Mar. 22, 1996

[30] Foreign Application Priority Data

Mar. 24, 1995 [CH] Switzerland .............................. 845/95

[51] Int. Cl.[6] ........................................................ B32B 3/00

[52] U.S. Cl. .......................... 428/195; 428/200; 428/204; 428/411.1; 428/913; 428/914

[58] Field of Search ................................ 428/195, 411.1, 428/913, 914, 192, 204, 500, 200

[56] References Cited

U.S. PATENT DOCUMENTS 5,736,212 4/1998 Fischer .................................. 428/42.2

FOREIGN PATENT DOCUMENTS 9414972 1/1995 Germany .
2235412 3/1991 United Kingdom .
2269340 2/1994 United Kingdom .

*Primary Examiner*—Elizabeth Evans
*Attorney, Agent, or Firm*—Tarolli, Sundheim, Covell, Tummino & Szabo

[57] ABSTRACT

The form (1) has an integrated, separable card. Parts (K1, K2) superimposed in the card are juxtaposed in the form (1), but can be bonded together by folding onto one another. Such cards are also called butterfly cards. At least one of the two card surfaces (F1) can be individually inscribed in the form (1), the inscription in the finished card being superimposed by a further layer and is consequently optionally sealed. For producing the form (1) it is sufficient to apply a prefabricatable multilayer material (2, 3) on one side to a form sheet (1) and in the vicinity of this material to perform at least one punching (S1, S2). The cards according to the invention can be punched out completely from the form (1), i.e. in web or frame-free manner and can consequently be easily released.

26 Claims, 15 Drawing Sheets

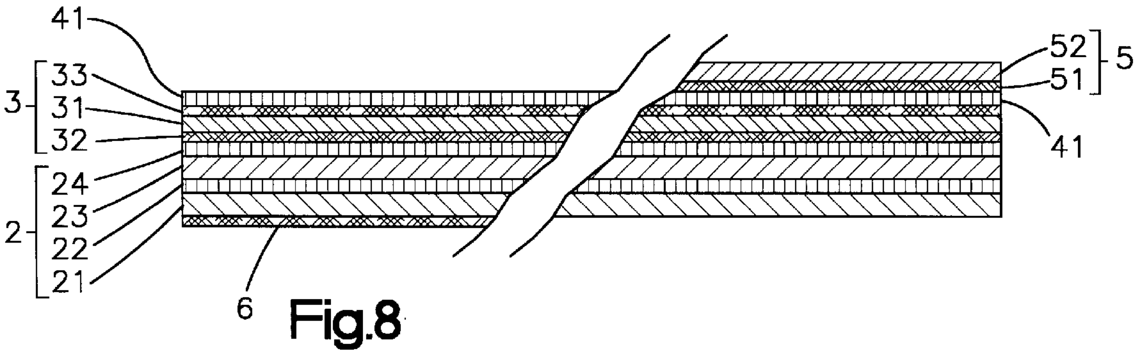
Fig.8
Fig.9a
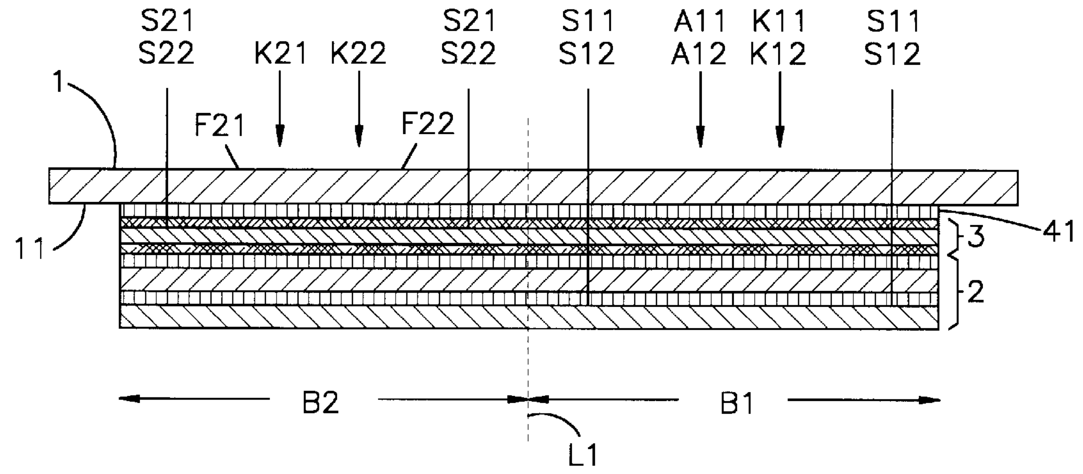
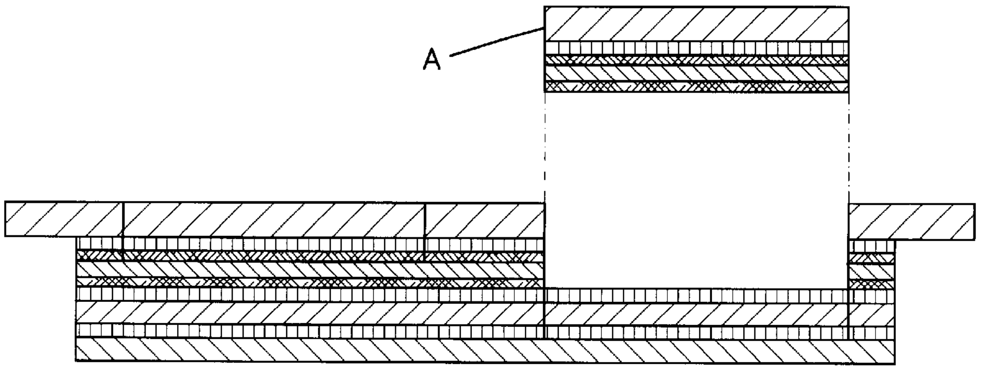
Fig.9b

FORM WITH INTEGRATED, SEPARABLE CARD AND MULTILAYER MATERIAL FOR PRODUCING SUCH A FORM

TECHNICAL FIELD

The present invention relates to a form with an integrated, separable card. Due to the need of folding onto one another and bonding together their various parts on release, such cards are normally called butterfly cards.

The invention also relates to a multilayer material for such a form.

Nowadays forms with a separable card are being increasingly used by organizations in order to receive subscriptions and forward at the same time a membership or identity card to the addressee. Numerous other use possibilities are conceivable. Certain use possibilities will also be mentioned in the present description.

PRIOR ART

Forms of the aforementioned type are already known in numerous constructions and are commercially available. However, these constructions suffer from certain disadvantages, which make it difficult to release the cards and/or give the finished card an unattractive appearance. Thus, in one known constructional form on punching, e.g. punching webs or frames are left behind, which on the released card are disadvantageous from the optical and tactile standpoints and form problem centres where there is a risk of the card tearing on release. After separating the card a hole is left behind in the form. The entire handling operation is not user-friendly.

DESCRIPTION OF THE INVENTION

The problem of the invention is to provide a form with a separable butterfly card, which avoids the aforementioned disadvantages. In particular, handling is to be easy and obvious, no punching webs are to be needed, but the card must be easy to release, but reliably held in the form plane up to release. The invention is also intended to make available a multilayer material suitable for producing such a form.

In the case of a form of the present invention, this problem is solved in that, considered from the form, the carrier material incorporates an adhesive layer and a carrier layer, the adhesion between the adhesive layer and the layer in front of it not being set in a permanent manner and that the at least one punching from the front of the form is carried out at least zonally, but at the most up to the adhesive layer.

Embodiments of the invention are described in greater detail hereinafter with reference to the attached drawings.

BRIEF DESCRIPTION OF THE DRAWINGS

FIG. 8 shows a multilayer material for producing forms according to the invention.

WAYS OF IMPLEMENTING THE INVENTION

Figure 1A:
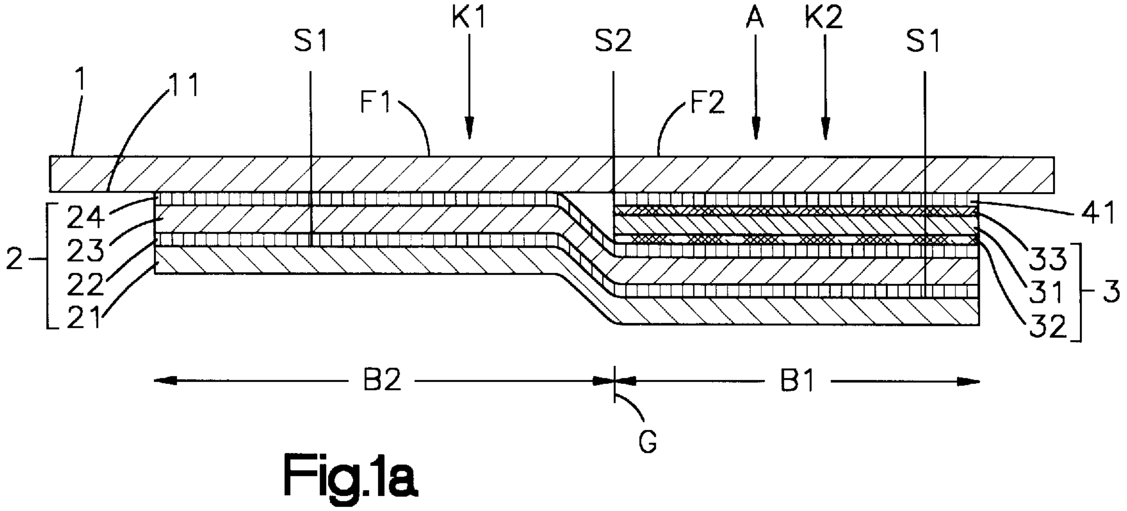
FIG. 1, *a*) to *f*), in each case in sectional form (section I—I in FIG. 2*b*) a first embodiment of a form according to the invention with integrated butterfly card and an additional card containing a self-adhesive label.

Reference is firstly made to FIGS. 1*a*) and 3*a*), in which 1 designates a form or form sheet. The latter is e.g. made from paper, onto which can be printed on one or both sides a random information, a pattern, etc. 2 is a preferably rectangular, smaller area piece of a carrier material, which incorporates a carrier layer 21, an adhesive layer 22, a covering layer 23 and a first permanent contact adhesive layer 24. By means of the permanent contact adhesive layer 24 the carrier material 2 is bonded to the back of the form 11, covering two areas B1 and B2, which border one another at the boundary line G.

In area B1 between the back 11 of form sheet 1 and the carrier material 2 is provided a separating layer or interlayer material 3, which incorporates a supporting layer 31 provided on both sides with a separating coating 32 or 33, e.g. a siliconized coating. For fixing the interlayer material 3 to the form back a second permanent contact adhesive layer 41 is provided.

Considered from the front of the form sheet 1, within the two areas B1 and B2 and therefore within the surface of the carrier material 2, an all-round, i.e. web or frame-free punching S1 is carried out, which passes through the form sheet 1 and the layers 24 and 23 and extends down to the adhesive layer 22 or even through the latter to the carrier layer 21. In area B1 additionally the permanent contact adhesive layer 41, as well as the layers 31 to 33 of the interlayer material are punched through.

By means of the punching S1 a punched blank is cut out of the form sheet 1 and which no longer has any connection with the surrounding material of the form sheet 1 and is only held in the form sheet 1 by the not punched through carrier layer 21 projecting over it on all sides. The punched blank incorporates in area B2 a first part K1 of the integrated butterfly card K. In area B1 it incorporates a second part K2 of the integrated butterfly card K and additionally a card A. The two parts K1 and K2 meet at the boundary line G. Along said boundary line G and immediately alongside the interlayer material 3 a further frame-free punching S2 is performed between the two card parts K1 and K2, but which only separates the form sheet 2 and extends down to the permanent contact adhesive layer 24 of the carrier material 2. The punching S2 subdivides the aforementioned punched blank into the card A and the actual butterfly card K with its parts K1 and K2. The punching S2 can be performed simultaneously with the punching S1 using the same punching tool.

Figure 1B:
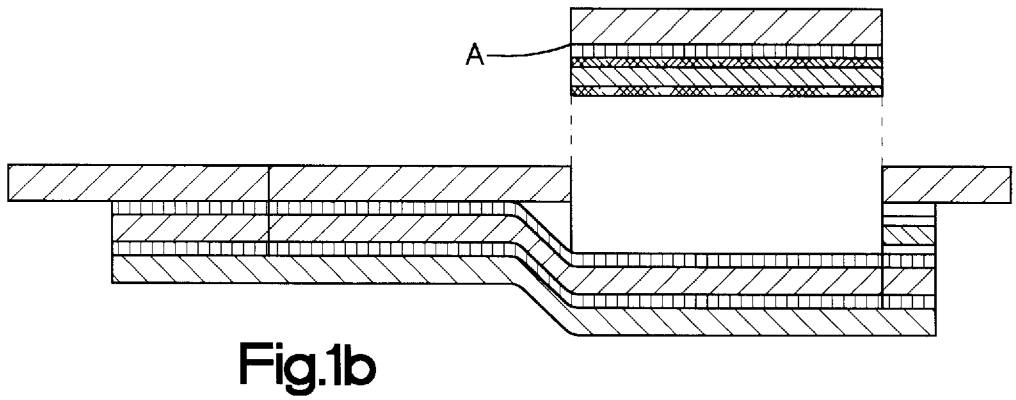
Figure 1C:
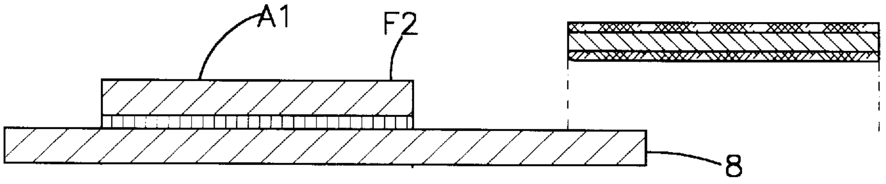

Due to the separating possibilities of the separating coating 32 of the supporting layer 31 of the interlayer material 3 the card A, incorporating the layers 1, 41, 33, 31 and 32, can be released from the form, as shown in FIGS. 1*b*) and 3*b*). Due to the separating properties of the further separating layer 33 the interlayer material 3 can subsequently also be detached from the contact adhesive layer 41 of the card A, which leads to a self-adhesive label A1, which can be stuck at another location, e.g. on another paper substrate 8, as shown in FIG. 1*c*). By means of a suitable setting of the separating values between the layers 32, 24 on the one hand and 33, 41 on the other, it can be ensured that the separation initially takes place between the two aforementioned layers.

Figure 1D:
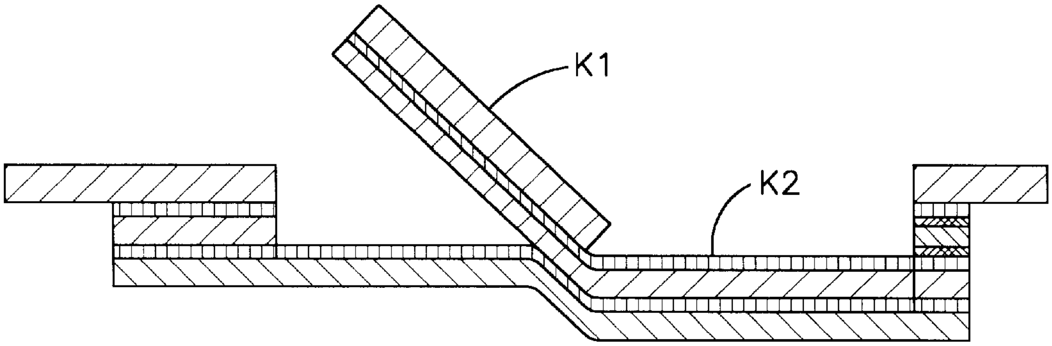
Figure 1E:
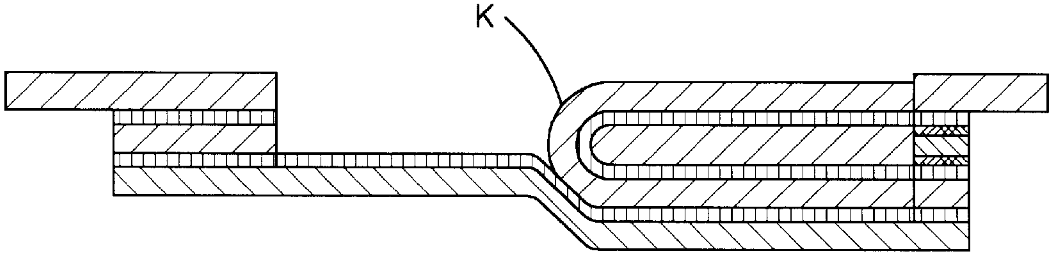
Figure 3A:
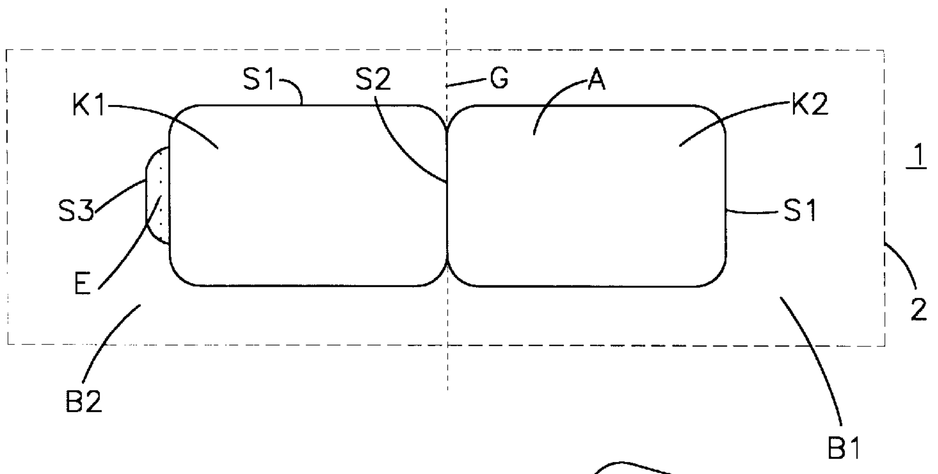
FIG. 3, under *a*) to *e*), shows top views of the front of the form of FIGS. 1 or 2 in the vicinity of the integrated card in different stages of its release from the form.
Figure 3B:
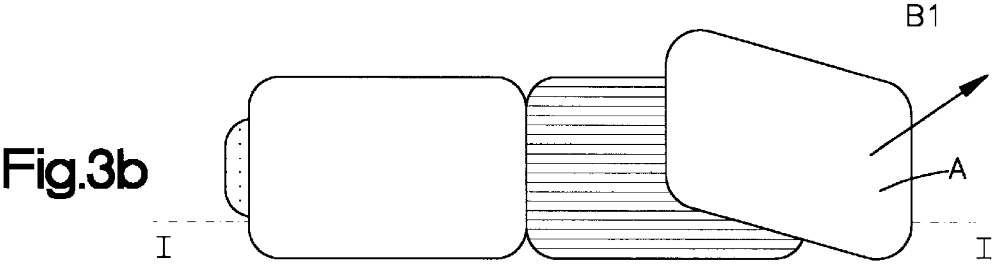
Figure 3C:
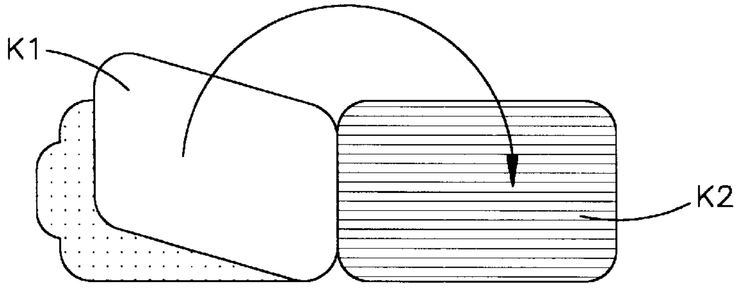
Figure 3D:
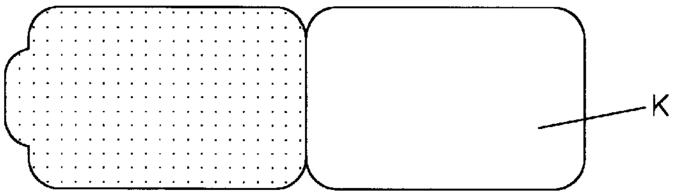
Figure 3E:
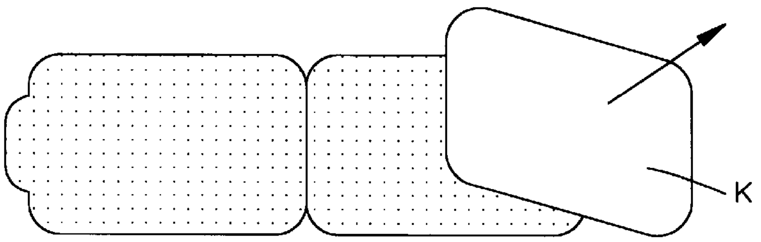

After releasing the card A the butterfly card K can also be removed. For this purpose initially its part K1 is detached from the adhesive layer 22 in area B2, as shown in FIGS. 1*d*) and 3*c*). After this the part K1 is folded round and bonded to part K2 in area B1, as shown in FIGS. 1*e*) and 3*d*). During the folding process the covering layer 23 acts as a hinge. Finally, the finished card K according to FIG. 1*f*) and FIG. 3*e*) can be removed from part B1.

The removal of the card K in the aforementioned manner presupposes that the carrier material 2 in the vicinity of the adhesive layer 22 is constructed in a separable manner, so that the covering layer 23 with the non-tacky surface is released. This can be achieved in different ways and in place of a unitary adhesive layer 22 it is possible to use a combination of several different layers. A simple example for this is formed by the combination of a permanent contact adhesive on the carrier layer 21 with a (silicone) separating layer on the covering layer 23. However, it is somewhat disadvantageous that, after separation, the surface released in the form would generally be sticky or tacky. Another possibility consists e.g. in the combination of two adhesive layers, which on the one hand adhere permanently to the carrier layer and on the other to the covering layer, but whose adhesion to one another is not set in permanent form and which after their separation (adhesion break) they are in practice no longer sticky or tacky. The separation could take place in a specific, unitary adhesive layer 22 by means of a cohesion break. However, it is disadvantageous in this embodiment that the covering layer 23 located on the surface in the finished card K necessarily carries an additional and possibly also sticky coating.

For the aforementioned reasons it is preferable to use a so-called clean release adhesive for the adhesive layer 22. In both the previously described and the subsequently described embodiments use is made thereof. Clean release adhesive is characterized in that to one side, in this case the carrier layer 21 it has a permanent adhesive action, whereas to the other side, here to the covering layer 23, it has a non-permanent adhesive action. On release there is an adhesion break at the covering layer 23. The clean release adhesive then remains completely on the carrier layer 21. The clean release adhesive has the characteristics typifying its name with respect to the covering layer 23. The clean release adhesive can be built up in one or multiple layer form, the former being preferred. It is preferably so adjusted that it is no longer tacky following the release of the card K.

In all embodiments it must be ensured that the said punched blank consisting of the two cards A and K is on the one hand sufficiently strongly and securely held in the form sheet 1, i.e. during the appropriate handling thereof or also in the case of automatic processing thereof it is not prematurely detached, but on the other hand the card parts K1 and K2 can be easily released.

A paper or a foil material can be used for the carrier layer 21 and, like the form, can carry printing. It can be transparent or opaque. In the latter case printing on the card-side surface of the carrier layer 21 and on the card back would initially be concealed and would only become visible on separating the cards A and K.

Figure 1F:
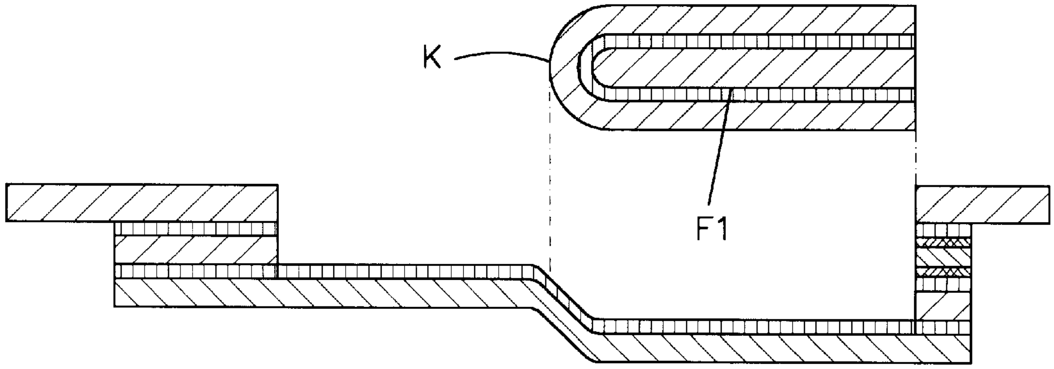

As is apparent from FIG. 1*f*), in the case of the card K the material from the form 1 is surrounded on both sides by the material of the covering layer 23 of the carrier material 2. If the covering layer material is transparent, printing or other inscriptions can be recognized and sealed on the form material. Without destroying the card it is impossible to modify them. Preferably the covering material is constituted by a sheet of a water-repellent or watertight plastics material.

The butterfly card K according to the invention is particularly suitable for individual writing or inscription, because the lower surface F1 of the material from the form 1 in FIG. 1*f*) is exposed on the form front in area B2. Thus, the card K can advantageously be used e.g. as an identity card, the recipient having the possibility to make his signature on surface F1 prior to the removal of the card K. Through the removal of the card k, as explained, the latter is sealed. In place of an inscription or in addition thereto it would be possible to stick to the surface F1 a passport photograph, a stamp or the like and seal in the same on removing the card K.

There are also interesting use possibilities for the additionally obtained card A. Its front surface F2 is exposed in the form in area B1 of the front thereof and can consequently be individually inscribed, e.g. simultaneously with surface F1 of card K. Thus, card A is particularly suitable as a control card in parallel to card K, its construction as a self-adhesive label representing an additional advantage.

The construction of the card A as a self-adhesive label is preferred within the scope of the invention, but is not absolutely necessary. Thus, without difficulty, the separating coating 33 in the separating layer or interlayer material 3 could be omitted. The interlayer material 3 would then be permanently connected by means of the permanent contact adhesive layer 41 to the form material and card A would not be self-adhesive. This would have no influence on the butterfly card K.

Due to the fact that the card K is present in the folded out state in the form, in the card area there is only a slight local thickening, which has a favourable influence on the processing of the form, e.g. in printers.

Although in the finished card K the form material is surrounded and sealed on both sides by the covering layer, the application of the layers 2 and 3 is limited to one side of the form, which is advantageous from the manufacturing standpoint.

As a removal aid E for the cards A and/or K, adjacent to the card parts K1, K2 or A, in form 1 could be provided additional punchings. FIG. 3 shows such a roughly semicircular punching adjacent to the card part K1 and designates S3 which, like the punching S1, extends to the adhesive layer 22 (for producing a removal aid for card A it would be sufficient, adjacent to card A, to punch solely up to the first permanent contact adhesive layer 24). The resulting punched blank is removed. In the vicinity of the punching S3 the card part K1 can be easily gripped and slightly raised at its exposed edge there. It would also be possible to make the punching through all the layers for producing the removal aid, so that adjacent to the card part K1 a hole would be formed. Preferably such a through-punching would be combined with further measures (such as e.g. an additional punching or an incision on the form back in the carrier material), so that a finger can grip behind the card part K1 through the hole from the front of the form.

For producing forms according to the invention use can be made of a multilayer material constituted by a carrier material 2 and the interlayer material 3, the interlayer material covering the entire surface of the carrier material. Such a multilayer material can be prefabricated and rolled up in endless web form.

Prior to cutting to length and applying the multilayer material to the back of the form sheets 1, the interlayer material 3 is roughly halved by a lengthwise longitudinal cut and the two halves are drawn off the carrier material 2. Through the drawing off half the permanent contact adhesive layer 24 of the carrier material is exposed. Thus, for bonding on the form back it is only necessary to provide the surface of the remaining interlayer material, e.g. with a wet adhesive application (second permanent contact adhesive layer 41). Following the application of the multilayer material to the form back the described punchings S1 and S2 and optionally S3 are carried out from the form front.

In FIG. 3 the two card parts K1 and K2 meet at their two narrow sides. They could equally well be arranged in the form 1 turned by 90°, i.e. adjacent to one another on their two longitudinal sides. The rectangular shape is not prescribed and other, e.g. round shapes are possible, provided that they can be made to at least partly coincide by folding round.

Figure 2:
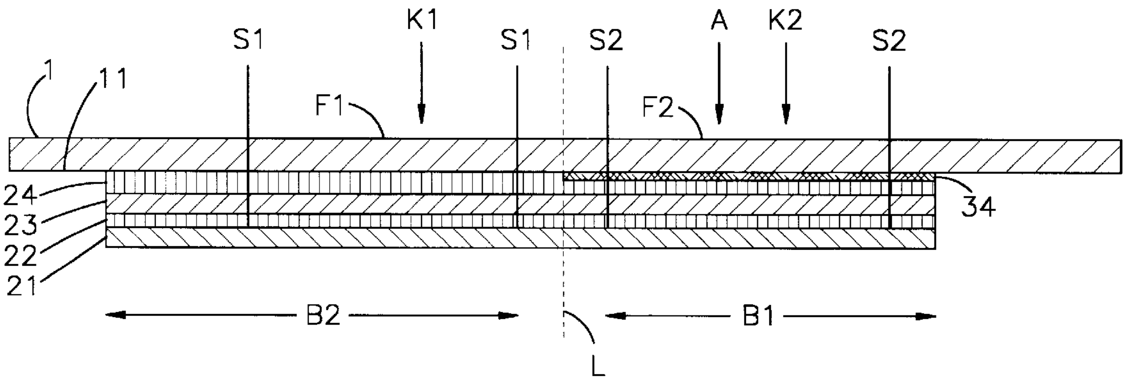
FIG. 2 is a sectional representation (section I—I in FIG. 2*b*) of a form embodiment simplified compared with that of FIG. 1 having an integrated butterfly card.

The embodiment of FIG. 2 differs from that of FIG. 1 in that here, in place of the interlayer material 3 and the second permanent contact adhesive layer 41, there is only one separating coating 34 on the form back 11 in area B1. This has no influence on the described handling of the form and the butterfly card. The card A consists solely of the form material and the separating coating 34. The latter is applied wet initially to the back of the form material in area B1 prior to the bonding on of the carrier material 2. As such a wet coating can lead to certain difficulties, the embodiment of FIG. 1 is preferred.

The embodiment of FIG. 2 differs from that of FIG. 1 also in that here the two card parts are not adjacent to one another at a boundary line and are instead arranged in mirror symmetrical manner and with a spacing with respect to a line L passing between the two areas. The punchings for fixing the two card parts can here be performed in two areas and in all-round manner down to the adhesive layer 22. In this embodiment the bonding of the two card parts K1 and K2 to one another takes place by folding the form along line L. The latter can be provided with a perforation for facilitating precise folding.

The two aforementioned constructions, in which the embodiment of FIG. 2 differs from that of FIG. 1, can obviously be used independently of one another.

Figure 4A:
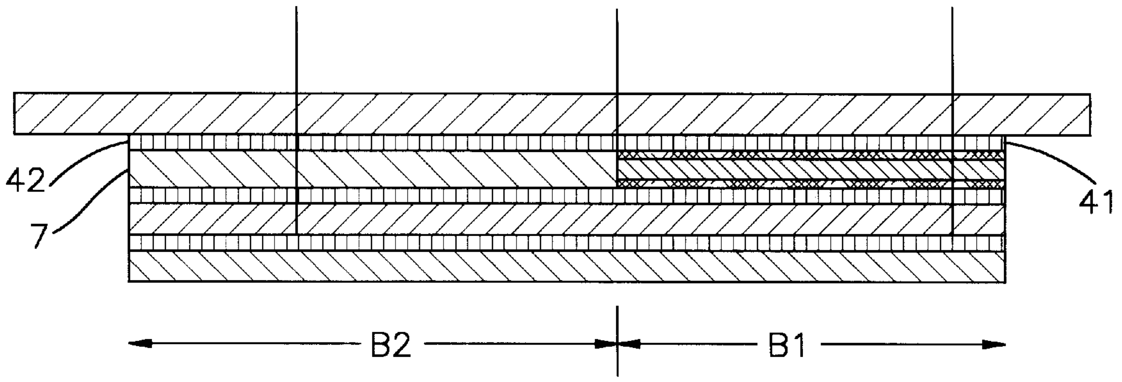
FIG. 4 under *a*) and *b*), in each case constitute a sectional representation corresponding to FIG. 1 of a further embodiment with an additional reinforcing layer.
Figure 4B:
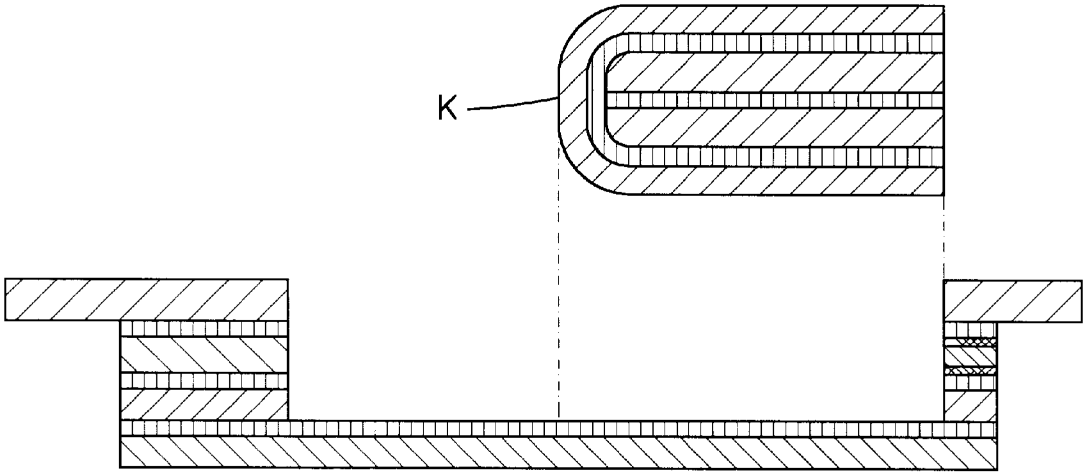

FIG. 4*a*) shows an embodiment in which in the area B2 between the form back and the carrier material 2 is also introduced a reinforcing layer 7 by means of a third permanent contact adhesive layer 42. The latter can be applied together with the permanent contact adhesive layer 41 in area B1 as a unitary layer during manufacture. As can be gathered from FIG. 4*b*), corresponding to FIG. 1*f*), in the finished card K the reinforcing layer 7 increases its thickness and stiffness. The reinforcing layer 7 is advantageously made from the same material as the form sheet 1. It can in fact be printed in the same operation as the form sheet on a secondary web, as shown in FIG. 5.

Figure 5:
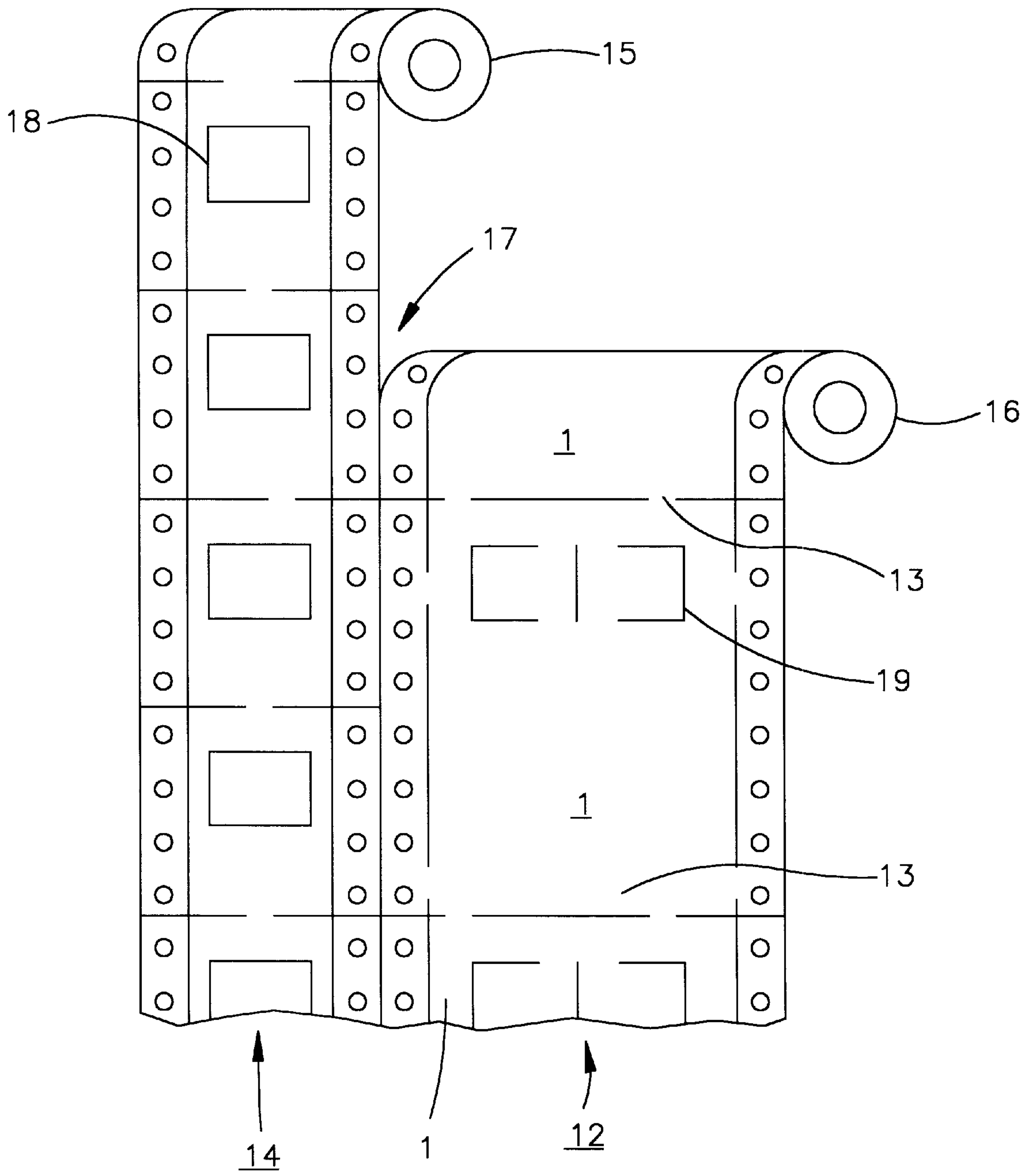
FIG. 5 is a diagrammatic top view showing how the forms and reinforcing layers of the embodiment of FIG. 4 can be printed in the same operation.

FIG. 5 shows an endless web 12 of already printed form sheets 1, which are connected by means of perforation lines 13. A secondary web 14 is laterally connected to the web 12 of form sheets I and is printed together therewith. The secondary web 14 is separated from the main web 12 at a point indicated by the arrow 17 and is wound onto a roll 15. The main web 12 is wound onto the other roll 16. A printing on the secondary web 14 is designated 18. Printing of corresponding size on the form sheets 1 in the vicinity of the subsequent cards is designated 19.

Figure 6A:
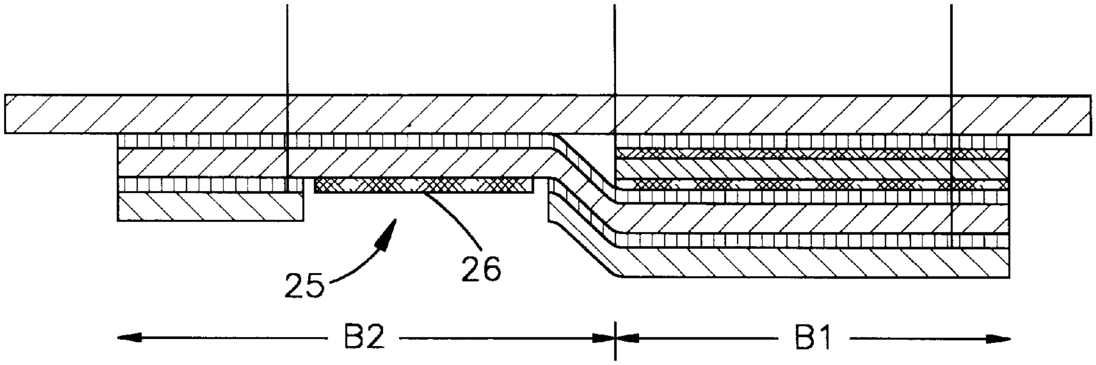
FIG. 6 under *a*) and *b*), shows in each case in sectional form corresponding to FIG. 1 an embodiment with a punched out window and a matting layer applied thereto.
Figure 6B:
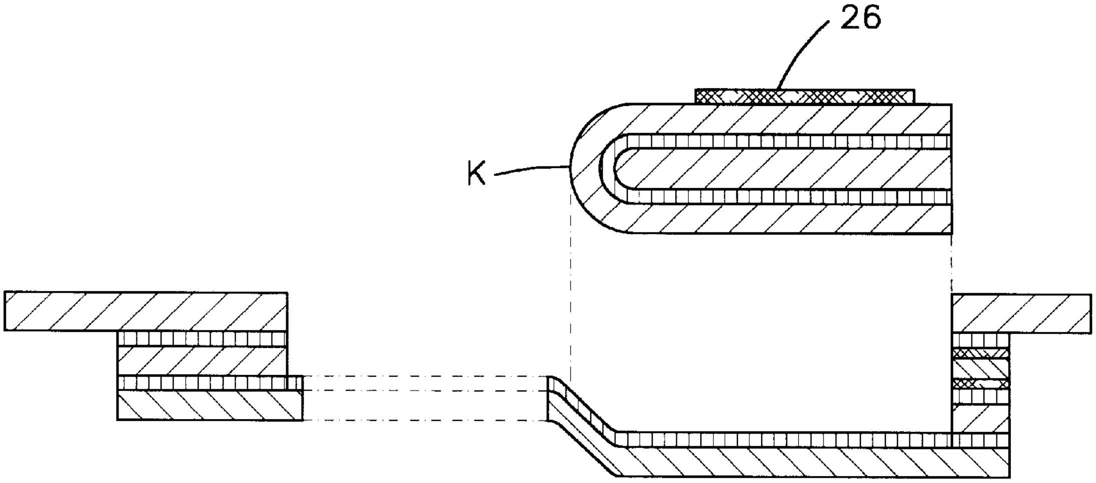

FIG. 6 shows an embodiment in which, in the vicinity of the card part K1, from the back a window 25 is punched into the carrier material 2 into the depth of the adhesive layer 22. Within the window 25 it is possible to provide, from the back, the card K with an individual impression or inscription. If for the covering layer a foil or sheet material is used, then for facilitating its printing or writing a matting 26 can be additionally provided in the window area.

Figure 7A:
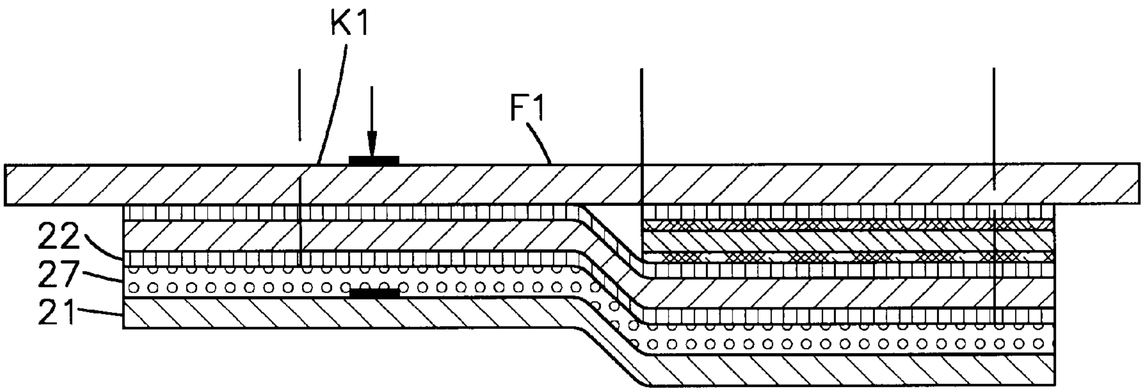
FIG. 7 under *a*) and *b*), in each case a sectional representation corresponding to FIG. 1 showing a further embodiment with an additional carbon paper layer.
Figure 7B:
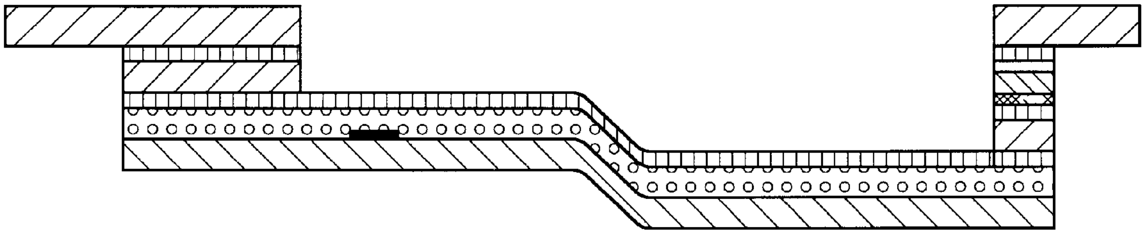

FIG. 7 shows an embodiment in which additionally there is a carbon paper layer 27 in the carrier material 2 between the carrier layer 21 and the adhesive layer 22. Such carbon paper layers normally contain ink in microencapsulated form, as well as fibres for absorbing ink released under pressure. If in this embodiment to the surface F1 of the card part K1 an inscription is applied manually or by impact printing, then in the carbon paper layer 27 an image of this inscription appears and is exposed after releasing the two cards and as can be gathered from FIG. 7.

FIG. 8 shows a multilayer material also usable as a starting material for the manufacture of forms of the aforementioned type. Here the permanent contact adhesive layer 41 is prefabricated and consequently need not be initially applied as a wet adhesive coating during form manufacture. There is a considerable manufacturing advantage as a result of this, because wet adhesive applications often cause problems and incur additional expenditure for the form manufacturer. In order that the multilayer material can be rolled onto itself again, in the right-hand part of FIG. 8 the permanent contact adhesive layer 41 is covered with a covering material 5, which can simply be a silicone paper, i.e. a covering paper 52 provided with a silicone finish 51 as a separating coating. It only fulfils the indicated purpose and is separated from the remaining layers during form manufacture. Instead of using a covering paper, as shown in the left-hand part of FIG. 8, to achieve rollability it would be possible to provide the back of the carrier layer 21 with a separating coating 6, e.g. once again a silicon finish.

A buttefly card will now be described in conjunction with FIGS. 9 and 10 present in the form in four parts K11 to K22 and which can be individually written or printed on both sides. Once again 1 is a form or form sheet, on whose back 11, covering two areas B1 and B2, is stuck a piece of a multilayer material. The multilayer material corresponds in unitary form to that shown in the right-hand part of FIG. 8 after removing the covering material 5. The multilayer material in the left-hand part of FIG. 8 could also be used.

However, it is again important for the present embodiment that the adhesion between the rear separating layer 32 of the interlayer material 3 and the first permanent contact adhesive layer 24 of the carrier material 2 is weaker than the adhesion between the front separating layer 33 of the interlayer material 3 and the second permanent contact adhesive layer 41. The covering layer 23 of the carrier material should once again be a transparent sheet.

From the front of the form sheet 1, within the two areas B1 and B2 are punched in frame-free manner with punching lines S11 to S22 a total of four punched blanks which can be, but need not be adjacent to one another. They must merely be positioned in roughly mirror-symmetrical manner on the one hand to a line L1 running between the two areas B1, B2 and on the other to a line L2 within the two areas B1, B2. In FIG. 10 they are shown spaced from the line L1, but adjacent to the line L2. It would consequently also be possible to have an arrangement with a spacing from line L2. The punching lines S21 and S22 in area B2 only pass through the form sheet 1 and the permanent contact adhesive layer 41. In area B1 the punching lines S11 and S12 extend down to the adhesive layer 22. Once again all the punchings could be simultaneously performed with the same punching tool.

In area B2 the two punched blanks correspond to parts K21 and K22 of the integrated butterfly card. In area B1 the two punched blanks incorporate parts K11 and K12 of the integrated butterfly card K and additionally two cards A11 and A12. The parts K21 and K22 incorporate the layers 1 and 41, the parts K11 and K12 the layers 23 and 24 and the cards All and A12 the layers 1, 41, 33, 31 and 32.

Due to the aforementioned separating characteristics of the separating layers 32 and 33 of the interlayer material 3, the cards A11 and A12 can be released from the form in one step, as shown in FIGS. 9*b*) and 10*b*).

Following the release of the cards A11 and A12, the form 1 is initially folded along the line L1 and the parts K21 and K22 are made to coincide with the parts K11 and K12. The surfaces F21 and F22 of parts K21 and K22 initially exposed in area B2 in the form adhere to the sticky surfaces (permanent contact adhesive layer 24) of the parts K11 and K12 in area B1 following the release of the cards A11 and A12. On again folding out the form, the two card parts K21 and K22 with their back surfaces are detached from the front separating layer 33 of the interlayer material 3 in area B2. Although the adhesion between the rear separating layer 32 of the interlayer material 3 and the first permanent contact adhesive layer 24 is weaker than the adhesion between the front separating layer 33 of the interlayer material 3 and the second permanent contact adhesive layer 41, the separation here takes place between the latter layers, because the punching lines S21 and S22 only extend down to the front separating layer 33 of the interlayer material 3.

Figure 9C:
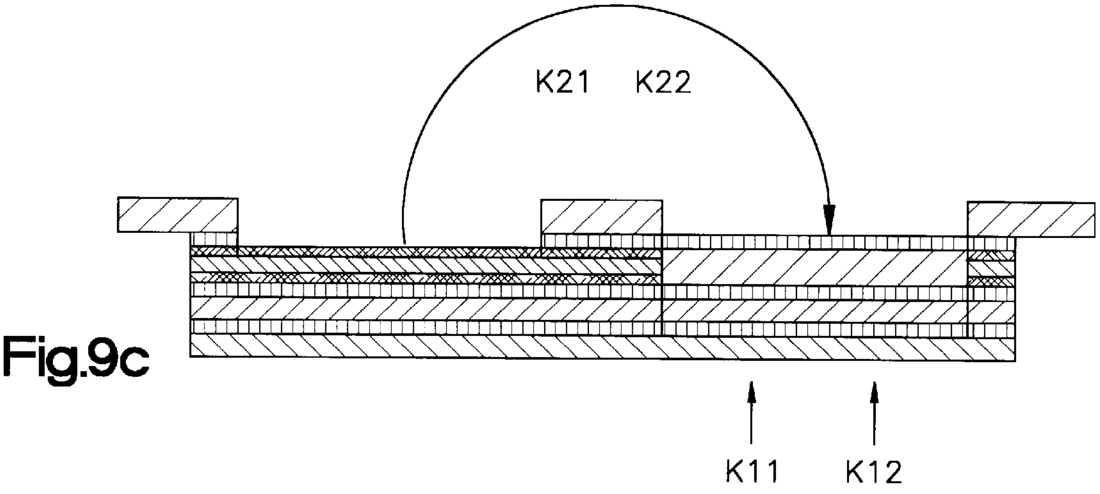
FIG. 9 under *a*) to *e*), in each case in sectional form (section II—II of FIG. 10*b*) shows an embodiment of a form according to the invention with an integrated butterfly card, which can be individually written or printed at the front and back.
Figure 9D:
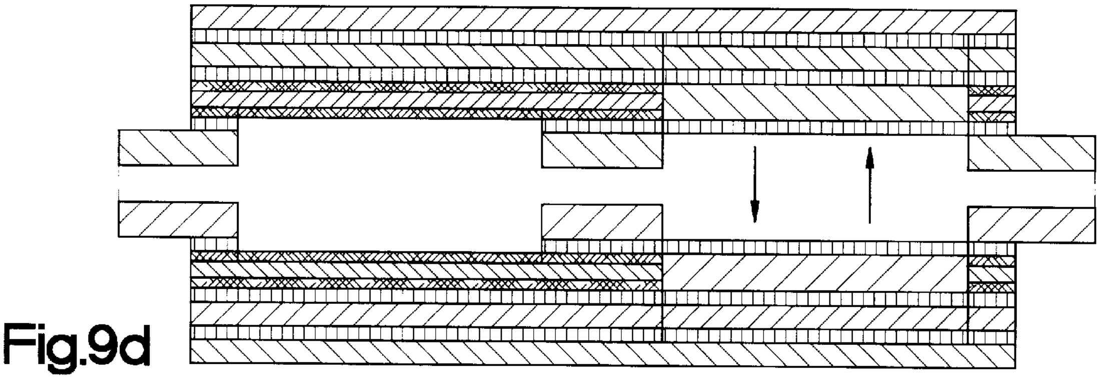
Figure 10A:
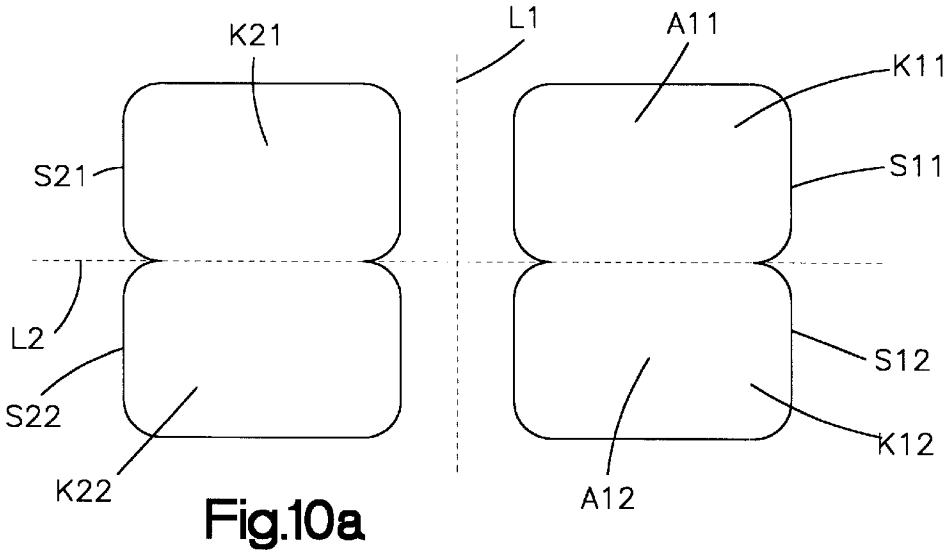
FIG. 10 under *a*) to *f*), top views of the front of the form according to FIG. 9, in each case shown in the vicinity of the integrated card in the different stages of its release from the form.
Figure 10B:
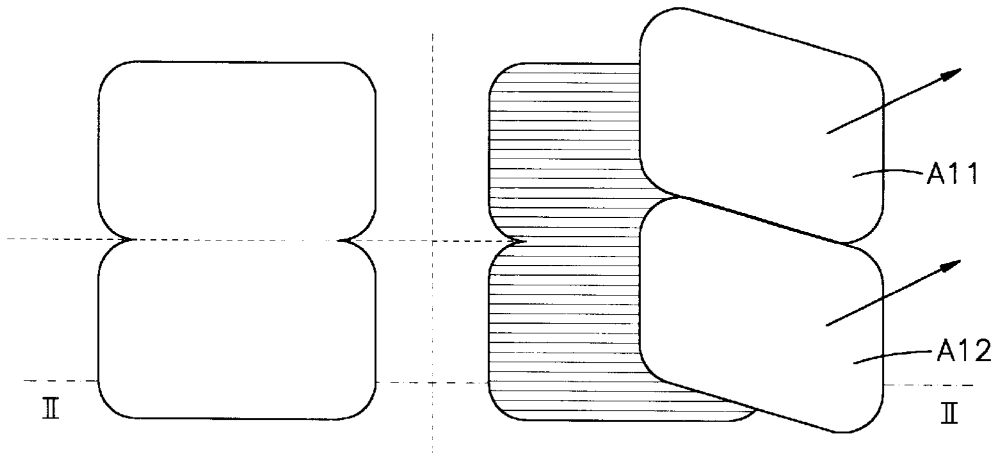
Figure 10C:
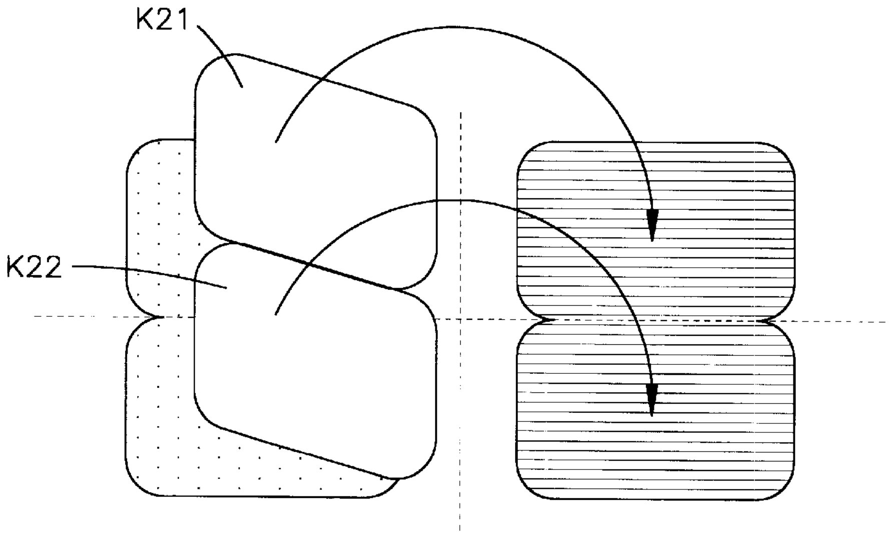
Figure 10D:
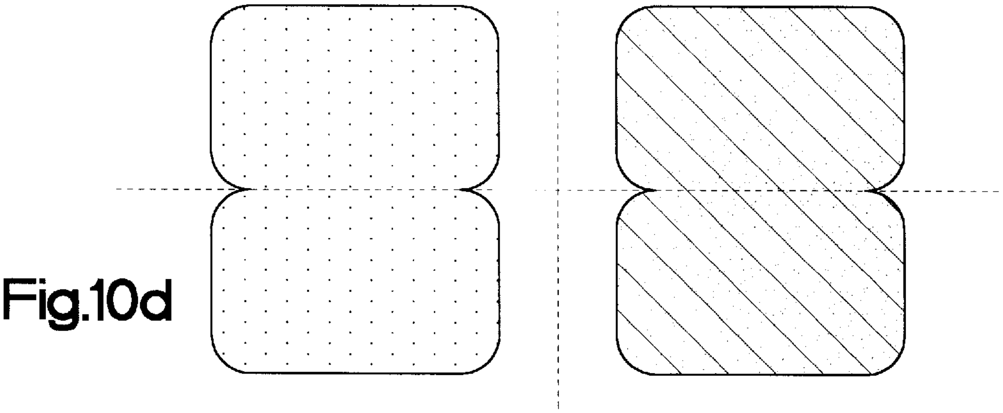
Figure 10E:
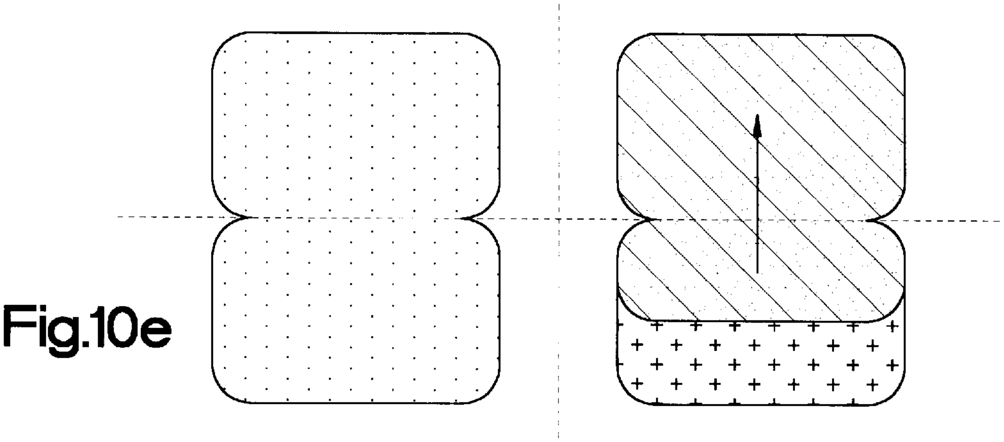
Figure 10F:
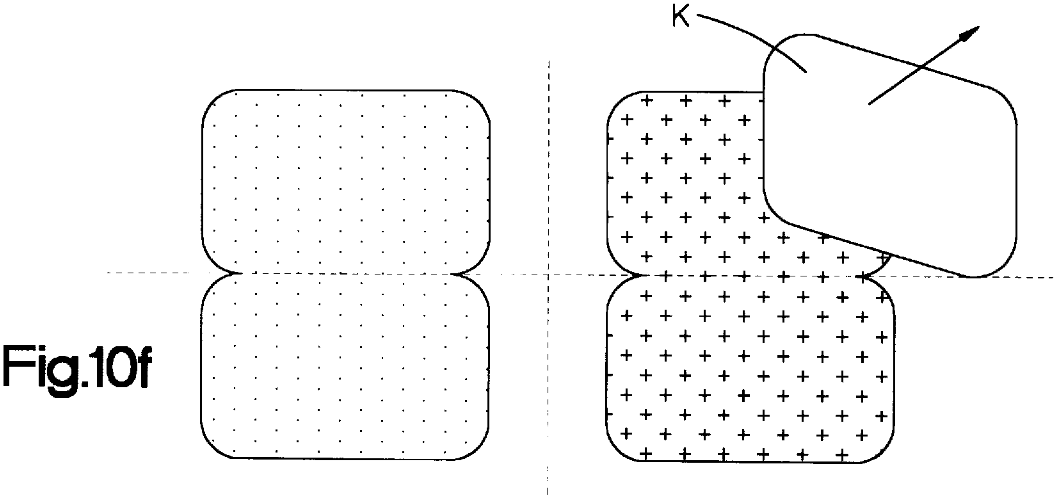

FIG. 10*c*) diagrammatically shows the transfer of the card parts K21 and K22 from area B2 into area B1. FIGS. 9*c*) and 10*d*) show the form following its transfer folded out again. Now, in area B1, the original backs of the parts K21 and K22 with their permanent contact adhesive coating 41 are exposed.

Figure 9E:
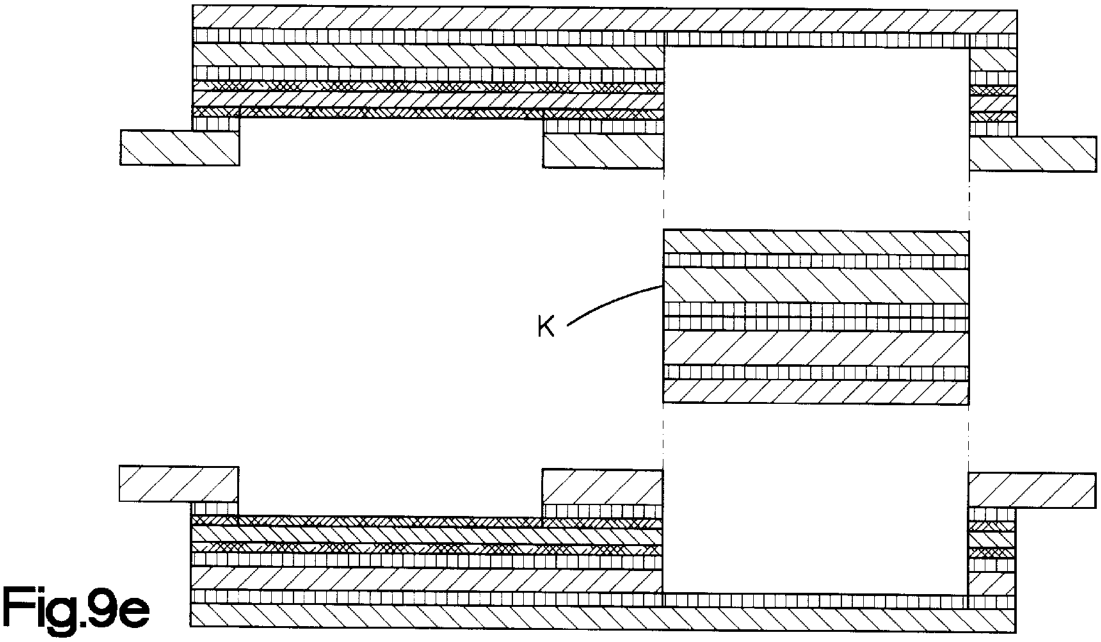

A further step for the release of the butterfly card involves the form 1 now being folded along line L2 and the sticky backs of the parts K21 and K22 being made to coincide and permanently bonded together. This process is diagrammatically illustrated in FIGS. 9*d*) and 10*e*). Finally and as shown in FIGS. 9*e*) and 10*f*), by again folding up the form the finished butterfly card can be removed and the covering layers 23 of parts K11 and K12 can in each case be detached from the adhesive layer 22. The covering layers 23 also form the two-sided surfaces of the finished card K.

Through the transparent covering layers 23 the original surfaces F21 and F22 of parts K21 and K22 are visible. As stated, in area B2 of the form they are both on the front form surface and can therefore be provided in the same operation with an individual impression or the like.

A perforation can be punched in along lines L1 and L2 as a folding aid.

Figure 11A:
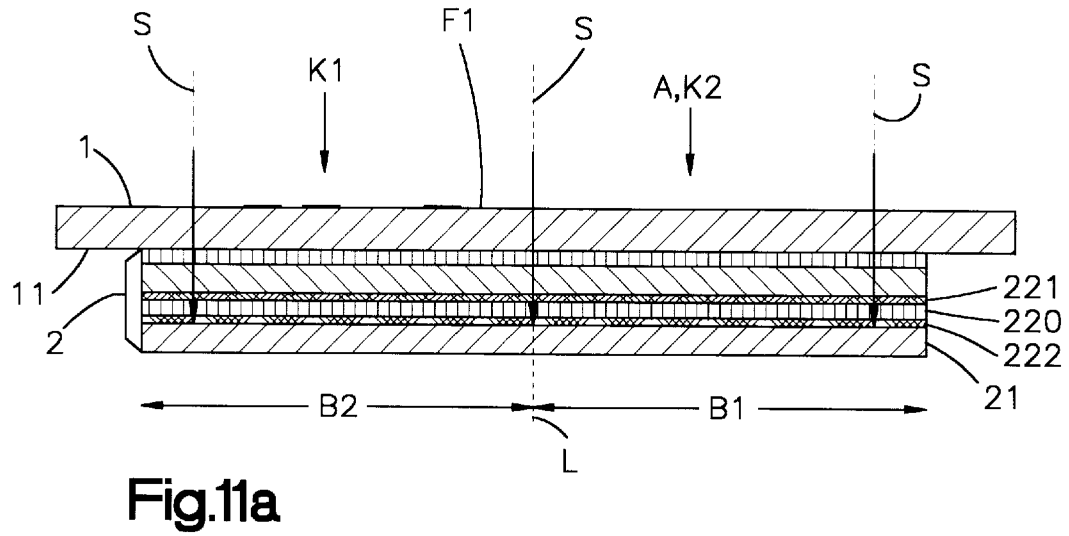
FIG. 11 under *a*) to *e*), in each case a sectional representation (section III—III of FIG. 13*b*), shows an embodiment of a form according to the invention with integrated vignette.
Figure 11B:
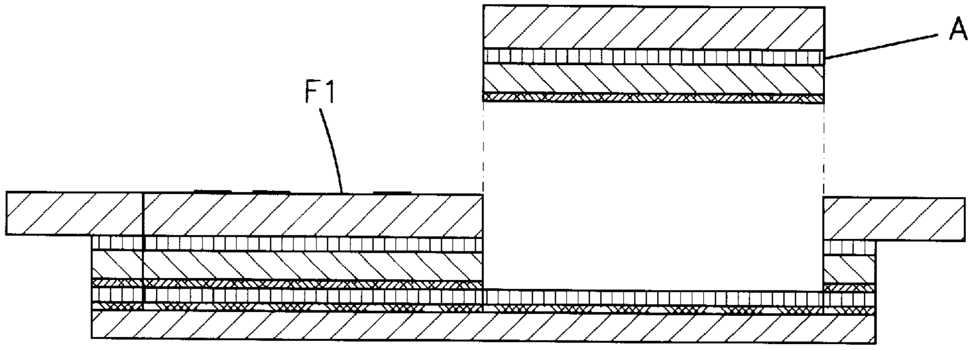
Figure 11C:
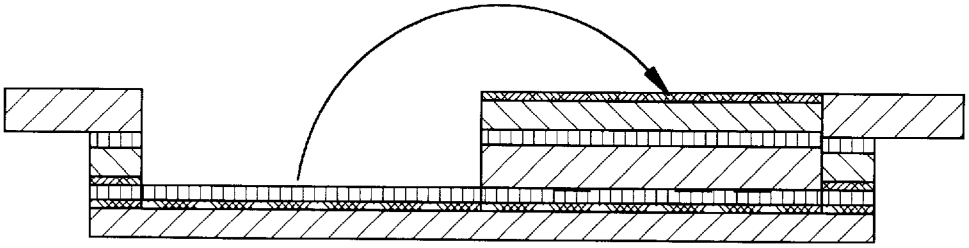
Figure 11D:
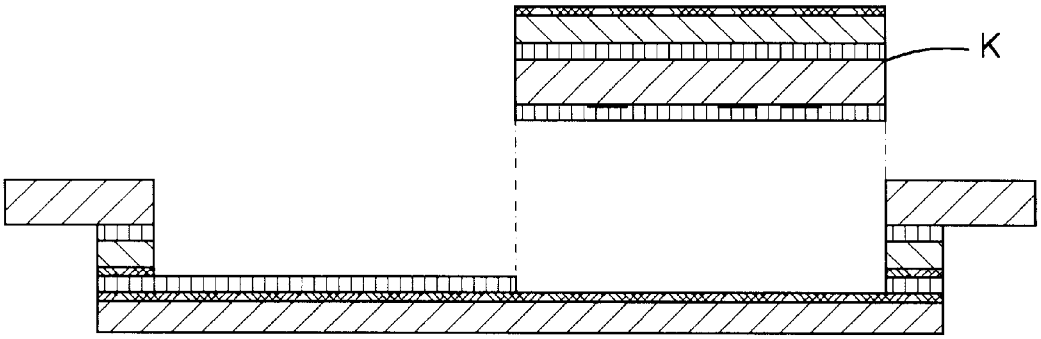
Figure 11E:
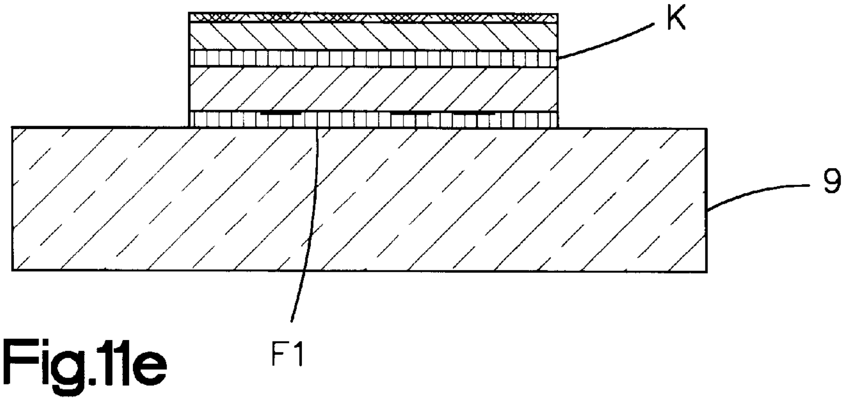
Figure 12:
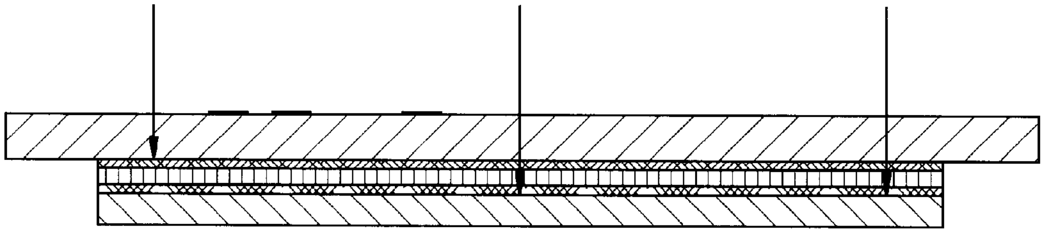
FIG. 12 a sectional representation (section III—III of FIG. 13*b*) showing a simplified embodiment of a form according to the invention with integrated vignette.
Figure 13A:
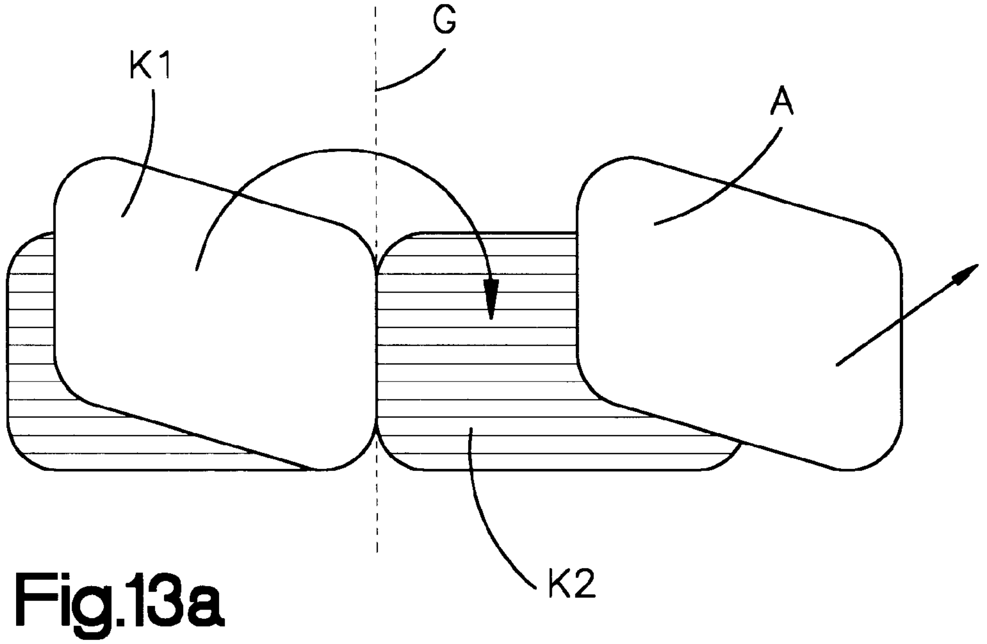
FIG. 13 under *a*) and *b*), top views of the front of the form of FIG. 11 or 12, in each case showing the area of the vignette in the different stages of its release from the form.
Figure 13B:
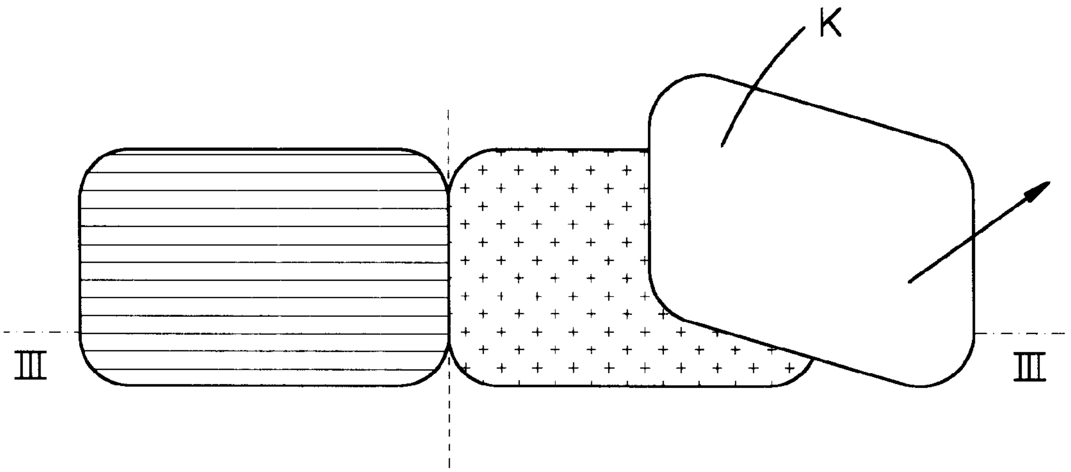

With reference to FIGS. 11 to 13 and initially FIGS. 11*a*) and 13*a*) an embodiment of a form according to the invention with integrated card K having vignette properties will be described.

Card K usable as a vignette is present in the form or form sheet 1 in two parts, called K1 and K2. Once again 2 designates a carrier material piece, which incorporates a carrier layer 21, an adhesive layer 22, a covering layer 23 and a first permanent contact adhesive layer 24. The adhesive layer 24 incorporates a permanent contact adhesive layer 220 in front of and behind which is in each case provided a (silicone) separating layer 221 and 222. The carrier material 2 is bonded by means of the first permanent contact adhesive layer 24 to the form back 11 covering two areas B1 and B2. The adhesion between the front separating layer 221 and the permanent contact adhesive layer 220 is weaker than the adhesion between the latter and the rear separating layer 222.

From the front of the form sheet I and within the two areas B1 and B2 punching takes place in frame-free manner with punching lines S of two punched blanks, which are adjacent to one another along a boundary line G. The punched blanks could also be punched out in mirror symmetrical manner spaced from the boundary line G. The punching lines S are made to a uniform depth up to the carrier layer 21. The punched blank produced in area B2 forms part K1 of the integrated vignette, incorporating the layers 1, 24, 23 and 28. Onto the surface F1 of this card part is applied the specific imprint or an individual inscription for the function of the vignette. This is diagrammatically indicated by the dark lines in FIG. 11. In area B1 the punched blank solely incorporates the second vignette part K2 comprising the permanent contact adhesive layer 220, as well as a card A, whose layer structure corresponds to the card part K1.

As a result of the explained separating characteristics of the separating layer 221, also in this embodiment the card A can be released from the form in area B1 in a first step, as illustrated by FIGS. 11*b*) and 13*a*). Due to the stronger adhesion between the separating layer 222 and the permanent contact adhesive layer 220 the latter is left behind on the carrier layer 21, but is exposed. By folding the form 1 along the boundary line G, which is preferably perforated, subsequently the surface S1 of the second card part K2 is made to coincide in area B1 with the exposed permanent contact adhesive layer 220 (card part K2), the permanent contact adhesive layer 220 being permanently connected to the surface F1. On again folding out the form, like previously the card A, the card part K1 is detached in area B2 from the permanent contact adhesive layer 220. FIG. 13*a*) diagrammatically shows the transfer of the card part K1 from area B2 to area B1 and FIG. 11*a*) the again folded out form after transfer has taken place. Due to the separating layer 222 the finished vignette K can then be released from the form, as shown in FIGS. 11*d*) and 13*b*).

As a result of the permanent contact adhesive layer 220 exposed on its back surface, the vignette K can be stuck onto or behind a glass plate 9, as shown in FIG. 11*e*). Through the glass 9 and the permanent contact adhesive layer 220 it is possible to see the surface F1 and its inscription.

FIG. 12 shows a simplified embodiment of a form according to the invention with integrated vignette. Unlike in the embodiment of FIG. 11, here in the carrier material 2 the first permanent contact adhesive layer 24 and the covering layer have been omitted. This has no influence on the handling of the form and the vignette.

It is finally pointed out that use can be made of an additional reinforcing layer according to FIG. 4, a punched out window, optionally provided with matting according to FIG. 6 and/or an additional carbon paper layer in combination with one another and in particular also in the embodiments according to FIGS. 9 to 13.

The described embodiments are characterized in that only a single punching process performed from one form side is required. The resulting punched blank or blanks can be free from any frame or web. Punching takes place in a depth-differentiated manner, but (apart from any through-punchings for forming removal aids), the carrier layer of the carrier material is always undamaged.

The aforementioned embodiments can be implemented using a uniform, homogeneous multilayer material prefabricated in rolled up form, but for differentiating the material in different sectors a slitting and partial removal of layers is required. This facilitates and rationalizes the working sequences in form manufacture.

In the forms according to the invention, all parts present in the end product, i.e. the finished card, remain directly or indirectly connected by means of the form up to the final removal of the card. This requires a specific sequence of manipulations for releasing the card and significantly facilitates the handling, because a support-free removal and new placing of card parts are avoided and there is no need for contact with adhesive surfaces.

We claim:

1. Form with integrated, separable card having superimposed parts in the card juxtaposed in the form, capable of being bonded together by folding one part onto another part, said form having a back and a carrier material being bonded to the form back and said card parts being fixed by at least one punching extending into the carrier material, characterized in that the carrier material, incorporates an adhesive layer and a carrier layer and that the carrier material is so separable in the vicinity of the adhesive layer that the front part is freed at the back such that the front part is free of sticky adhesive material after being freed from the front part and that the at least one punching is performed from the form front at the maximum down to the adhesive layer.

2. Form according to claim 1, characterized in that the carrier material, considered from the form, has a first permanent contact adhesive layer, a transparent covering layer, the adhesive layer and the carrier layer, the adhesive layer being in the form of a clean release adhesive layer with respect to the covering layer.

3. Form according to claim 2, characterized in that the card is present in the form in two parts, that the carrier material is bonded to the form back by means of a first area and a second area, which are adjacent to one another along a boundary line, that within the two areas, the two card parts are adjacent to one another along the boundary line and fixed by at least one punching, that in the first area between the form back and the carrier material is provided a first separating layer, and that the at least one punching is performed from the form front along the boundary line between the two card parts up to the first permanent contact adhesive layer, but otherwise to the adhesive layer in the carrier material.

4. Form according to claim 3, characterized in that in the first area between the form back and the carrier material, there are a second permanent contact adhesive layer and an interlayer material, with the second permanent contact adhesive layer being adjacent to the form back.

5. Form according to claim 4, characterized in that the interlayer material has a carrying layer and that the latter is provided only on one side towards the carrier material with a separating coating forming the first separating layer.

6. Form according to claim 5, characterized in that the interlayer material has a carrying layer and the latter is provided on both sides with a separating coating.

7. Form according to claim 4, characterized in that in the second area between the form back and the carrier material, are introduced a third permanent contact adhesive layer and a reinforcing layer, which is preferably made from the form material, with the third permanent contact adhesive layer being adjacent to the form back.

8. Form according to claim 3, characterized in that in the second area and from its back, a window is punched out from the carrier material to the depth of the adhesive layer.

9. Form according to claim 8, characterized in that a matting is applied within the window to the covering layer of the carrier material.

10. Form according to claim 2, characterized in that the card is present in the form as two parts, that the carrier material is bonded to the form back by means of a first area and a second area, that within the two areas the two card parts are fixed adjacent to a line running between the two areas by at least one punching, that a first separating layer is present in the first area between the form back and the carrier material and that the at least one punching is carried out from the form front and up to the adhesive layer in the carrier material.

11. Form according to claim 10, characterized in that the carrier material has a carbon paper layer between the adhesive layer and the carrier layer.

12. Form according to claim 2, characterized in that the card in the form is present in four parts, that the carrier material is bonded to the form back in a first area and a second area, that within the two areas, adjacent to a first line running between the two areas and adjacent to a second line perpendicular to the first line, two card parts are fixed by at least one punching, that in the two areas between the form back and the carrier material, considered from the form, is provided a second-permanent contact adhesive layer and an interlayer material, that the interlayer material has a carrying layer provided on both sides with a separating coating, the adhesion between the rear separating coating and the first permanent contract adhesive layer being weaker than the adhesion between the front separating coating and the second permanent contract adhesive layer and that the at least one punching is performed from the form front in the second area up to the second permanent contact adhesive layer and in the first area up to the adhesive layer in the carrier material.

13. Form according to claim 2, characterized in that the card in the form is present in two parts, that the carrier material is bonded to the form back in a first area, that within the first area, adjacent to a second line, two card parts are fixed by at least one punching, that in the first area between the form back and the carrier material, considered from the form, is provided a second-permanent contact adhesive layer and an interlayer material, that the interlayer material has a carrying layer provided on both sides with a separating coating, and that the at least one punching is performed from the form front in the first area up to the adhesive layer in the carrier material.

14. Form according to claim 1, characterized in that the card is a vignette with a self-adhesive front and is present in the form in two parts, that the adhesive layer incorporates a further permanent contact adhesive layer and in front of and behind the latter in each case a separating layer, the adhesion between the further permanent contact adhesive layer and the separating layer in front of it is weaker than the adhesion between the further permanent contact adhesive layer and the separating layer behind it, that the carrier material is bonded to the form back in a first area and a second area, that within the two areas the two card parts are adjacent to a line running between the two areas by at least one punching and that the at least one punching is performed from the form front extending to the adhesive layer in the carrier material.

15. Form according to claim 14, characterized in that in the carrier material between the form and the front separating layer, considered from the form, are provided a first permanent contact adhesive layer and a transparent covering layer.

16. Multilayer material for producing a form according to claim 14, characterized in that it incorporates the following coatings in the indicated order:

a first permanent contact adhesive layer;

a covering layer;

a separating layer;

a further permanent contact adhesive layer;

a separating layer;

a carrier layer;

the adhesion between the permanent contact adhesive layer and the separating layer in front of it being weaker than the adhesion between the permanent contact adhesive layer and the separating layer behind it.

17. Form according to claim 1, characterized in that the at least one punching punches completely through without leaving punching frames or webs.

18. Form according to claim 1, characterized in that paper or foil is used as the material for the form, covering layer, reinforcing layer, carrying layer of the interlayer material and/or the carrier coating of the carrier material, but preferably a transparent, water-repellent or watertight foil is used for the covering layer of the carrier material.

19. Form according to claim 1, characterized in that a removal aid is punched out adjacent to at least one of the card parts.

20. Multilayer material for producing a form according to claim 1, characterized in that it incorporates the following coatings in the indicated order:

an interlayer material;

a first permanent contact adhesive layer;

a covering layer;

an adhesive layer;

a carrier layer;

the adhesion between the adhesive layer and the covering layer being non-permanent, but permanent between the adhesive layer and the carrier layer.

21. Multilayer material according to claim 20 for producing a form, characterized in that the interlayer material has a carrying layer which is provided on one side, towards the first permanent adhesive layer, or on both sides with a separating coating.

22. Multilayer material according to claim 20 for producing a form, characterized in that the interlayer material has a carrying layer, which is provided on both sides with a separating coating.

23. Multilayer material according to claim 22, characterized in that the interlayer material is provided at the front with a second permanent contact adhesive layer, the adhesion between the rear separating layer and the first permanent contact adhesive layer being weaker than the adhesion between the front separating layer and the second permanent contact adhesive layer.

24. Multilayer material according to claim 23, characterized in that the front, second permanent contact adhesive layer is covered by a covering material which is detachable from the second permanent contact adhesive layer or from the carrier layer and is provided at the back with a separating coating.

25. Multilayer material according to claim 20, characterized in that a carbon paper layer is inserted between the clean release adhesive layer and the carrier layer.

26. A form comprising:

an integrated card formed by at least one punching, said card being separable from said form and having superimposed parts juxtaposed in said form, said form having a front surface and a rear surface; and a carrier material bonded to at least a portion of said rear surface;

said carrier material including a first permanent contact adhesive adjacent to said rear surface, a covering layer adjacent to, and adhered to, said first permanent contact adhesive, an adhesive layer adhered to, and adjacent to, said covering layer, and a carrier layer adjacent to, and adhered to, said adhesive layer;

said at least one punching extending from said front surface of said form into said carrier material without extending into said carrier layer;

said parts being capable of being bonded to each other by folding one card part onto another card part;

said covering layer being separable from said adhesive layer, said covering layer being free of any adhesive material, and no longer being sticky, after being separated from said adhesive layer.

* * * * *